C. H. CHAPMAN.
BALL BEARING.
APPLICATION FILED SEPT. 15, 1914.

1,163,212.

Patented Dec. 7, 1915.

WITNESSES
A. I. Riedel
E. M. Finnel

INVENTOR
Charles H. Chapman
by Wm. F. Finnel
Atty.

UNITED STATES PATENT OFFICE.

CHARLES H. CHAPMAN, OF WINCHESTER, MASSACHUSETTS.

BALL-BEARING.

1,163,212.  Specification of Letters Patent.  Patented Dec. 7, 1915.

Application filed September 15, 1914.  Serial No. 861,814.

*To all whom it may concern:*

Be it known that I, CHARLES H. CHAPMAN, a citizen of the United States, residing at Winchester, in the county of Middlesex and State of Massachusetts, have invented a certain new and useful Improvement in Ball-Bearings, of which the following is a full, clear, and exact description.

The object of this invention is to provide a simple, compact and efficient ball bearing, capable of adjustment as desired, and in which the adjustment may be fixed against displacement in use.

The invention is in the nature of an improvement on the ball bearing disclosed in my case Serial No. 789,361, filed September 11, 1913, and particularly with respect to the construction of the cups forming the outer member of the bearing members, their adjustment into working position, and the means for locking these cups in adjusted position, secure against accidental displacement or disturbance in use, as I will proceed now to explain and finally claim.

Figure 1:
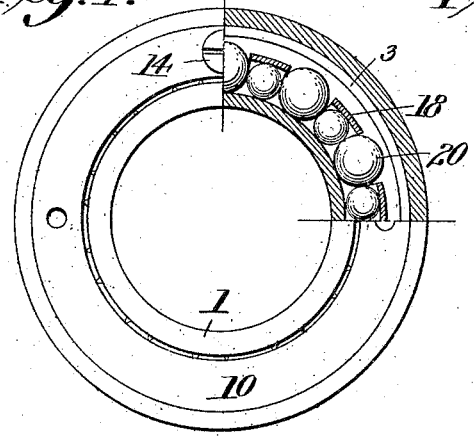
Figure 2:
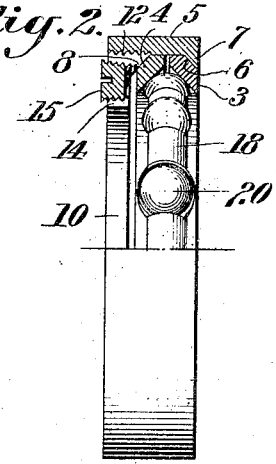
Figure 3:
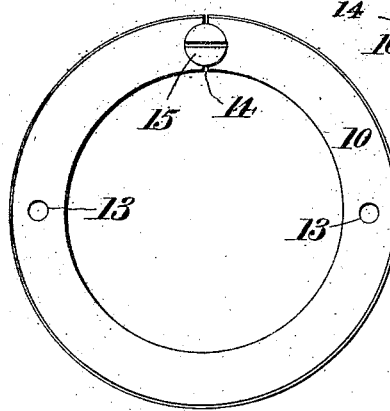
Figure 4:
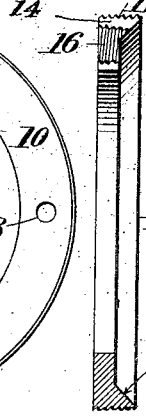
Figure 5:
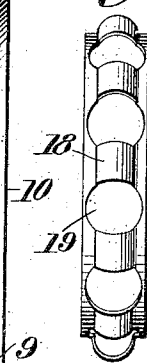
Figure 6:
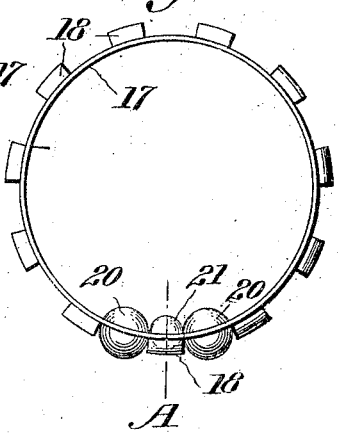
Figure 7:
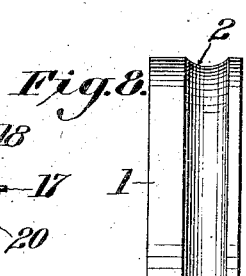
Figure 8:

In the accompanying drawings illustrating the invention, in the several figures of which like parts are similarly designated, Figure 1 is a front elevation, and quarter section, and Fig. 2 is an edge elevation and similar section, illustrating the complete bearing. Fig. 3 is a front elevation, and Fig. 4 is a vertical section of the locking ring detached. Fig. 5 is an edge view of the ball retainer without the balls; Fig. 6 is a front elevation thereof with two load-carrying balls and one idler ball in position, and Fig. 7 is a cross section taken substantially in the plane of line A of Fig. 6. Fig. 8 is an edge elevation of the cone.

As in the application referred to so here, 1 is a cone, so called, which forms the inner or central bearing member. This cone is in the form of a ring, and has the circumferential groove 2 in which the balls run. The outer member of the bearing is composed of a stationary annular cup 3 and an adjustable annular cup 4, and an inclosing housing 5. The cups 3 and 4 have their inner faces beveled or otherwise prepared to form an outer groove for the balls complementary to the groove 2 in the cone 1. The cup 3 is constructed in any suitable way to fit in the housing 5, and for this purpose, as herein shown, the back of the cup is beveled at 6 to engage a correspondingly beveled flange 7 at the back of the housing. The adjustable member 4 likewise is arranged so as to be accurately adjusted within the housing and toward the stationary cup 3 in order to afford the proper race way for the bearing balls; and the back 8 of this adjustable cup may be constructed in any suitable way to receive pressure from a fixing medium. As herein shown, the back 8 of the cup 4 is beveled, and this beveled portion is engaged by the complementary beveled portion 9 on the locking ring 10, and this locking ring is provided with an external circumferential screwthread 11 by means of which it may be screwed into the internally screwthreaded rim 12 of the housing 5. For the purpose of screwing the locking ring 10 into and out of the housing, it may have holes 13 in its face to receive a spanner wrench. In order to fix the locking ring in position so as to fix the adjustment given to the adjustable cup, this ring is split at 14, as shown in Figs. 2, 3 and 4, and by means of this split the ring is capable of being expanded within the housing and held in such expanded position with sufficient force to prevent its running out of the housing accidentally. A convenient and efficient expanding medium is the tapered screw 15 fitted in correspondingly threaded recesses 16 in the opposite ends of the ring 10 adjacent to the split 14 therein, so that by turning the screw into the ring, the ring may be expanded within the housing, and so held in adjusted position. When it is desired to readjust the adjustable cup, the screw may be loosened or run out, thereby releasing the locking ring and permitting it to be turned to a new adjustment or entirely removed.

The ball retainer 17 is of ring form, and its periphery is provided with a series of alined or concavo-convex projections 18, and intermediate openings 19. As shown in Fig. 7, these projections 18 constitute practically a periodically interrupted groove. This ball retainer is made preferably as a continuous instead of as a sectional ring, but otherwise is substantially like what is shown in my case Serial No. 813,971, filed January 23, 1914. The openings 19 receive the load-carrying balls 20 which are thereby flanked at opposite points by the projections 18, and these projections receive the idler balls 21, and all of these balls run in the groove 2 of the cone 1.

It will be seen that in the present invention, cups 3 and 4 are supported entirely by the adjacent beveled portions of the housing and locking ring, and in this way the cups are not only alined with relation to each other, but they are adapted to compensate for the slightest variations of the alinement of the axes of the cone and housing. The alining feature of the cups is due to the narrow surface of the beveled parts as compared with the proportionately large diameter of the cups.

Slight variations in the threaded portions of the housing or adjustable ring are compensated for by the yielding feature of the latter, for when the proper adjustment is obtained the tapered screw is screwed into the adjustable ring and thereby expands the ring into the threaded portion of the housing with such force that it is impossible to move the adjustable ring, and the adjustment of the bearing become fixed against possible accidental displacement or disturbance.

The cups 3 and 4 may be made as duplicates, so that either one may be used as a stationary cup or an adjustable cup, and this interchangeability of the cups simplifies the method of their production, and overcomes the possibility of getting the cups misplaced in assembling the bearing.

The cone and cups may be made of high grade steel, and hardened and tempered to insure both strength and great wearing qualities, after which they are ground to the required proportions.

The bearing is assembled by laying down the housing 5 with its screwthreaded portion uppermost, and then the cup 3 is dropped into the housing; the cone is then placed within the housing, and the ball retainer is also placed within the housing and around the cone, a load-carrying ball being placed in one of the openings in the retainer and then an idler ball next to it, and then a load-carrying ball, and so on successively until the circuit of balls is complete; then the cup 4 is placed in the housing next to the balls, and the adjustable locking ring 10 is then screwed into the housing and down against the uppermost or adjustable cup until the bearing is properly adjusted, and then this locking ring is fixed in the given adjustment by operation of the expanding screw 15.

The idler balls when in position act as separators between the load-carrying balls and prevent cross friction; and they also serve as friction drivers between the load-carrying balls when the bearing is in operation, thereby insuring a positive revolution of the load-carrying balls.

It is to be understood that the invention is not limited to the details of construction shown and described, and that structural variations within the spirit of the invention are contemplated.

What I claim is:—

1. A ball bearing, having a grooved cone, a stationary cup, an adjustable cup, said cups having beveled backs, an exterior housing in which said cups are arranged, an adjustable ring beveled to engage the adjacent cup and fitted in the housing to maintain the cups in alinement with each other and thereby form with the cone an uninterrupted ball race, balls within said ball race, and means to lock the ring against accidental displacement.

2. A ball bearing, having a grooved cone, stationary and adjustable cups alined with the cone and forming therewith an uninterrupted ball race, balls within said ball race, a housing for receiving all of these parts, a split ring adjustably fitted in said housing, said housing and ring having beveled portions engaging the cups, and means to lock the ring in the adjusted position.

3. A ball bearing, composed of a grooved cone, an adjustable and expansible split ring, a housing adapted to receive said ring, said ring and housing having beveled portions, ball cups arranged within said housing, held in place therein by said beveled portions, and together with the cone forming an uninterrupted ball race, balls interposed between the cone and cups, and means to expand said ring in the housing and lock it against displacement.

4. A ball bearing, composed of a grooved cone, cups forming an uninterrupted ball race, balls within the said ball race, a housing within which the said cups are sustained, and an adjustable split locking ring adapted to be expanded in said housing to lock the adjustment of the bearing.

5. A ball bearing, comprising an exterior housing having a beveled back, a ball cup seated within the housing on said back and complementally shaped, a second ball cup of like structure and interchangeable with the first named cup and arranged parallel with and alongside of said first named cup, and an adjustable expansion ring fitted in the housing and itself having a beveled surface complemental to the adjacent surface of the cup.

In testimony whereof I have hereunto set my hand this fourteenth day of September A. D. 1914.

CHARLES H. CHAPMAN.

Witnesses:
A. SHERMAN,
R. M. KOEHLER.